UNITED STATES PATENT OFFICE.

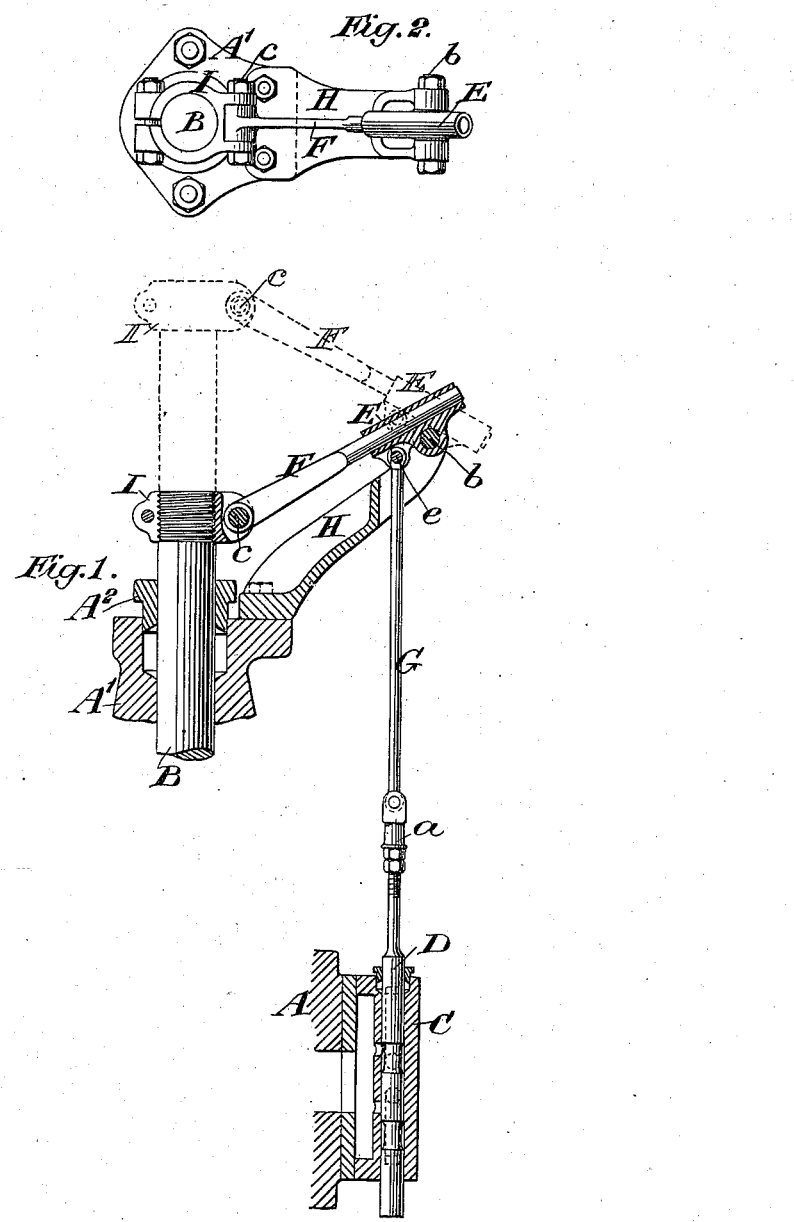

HENRY C. SERGEANT, OF WESTFIELD, NEW JERSEY, ASSIGNOR TO THE INGERSOLL-SERGEANT DRILL COMPANY, OF NEW YORK, N. Y.

VALVE-GEAR.

SPECIFICATION forming part of Letters Patent No. 565,803, dated August 11, 1896.

Application filed August 15, 1895. Serial No. 559,337. (No model.)

*To all whom it may concern:*

Be it known that I, HENRY C. SERGEANT, of Westfield, in the county of Union and State of New Jersey, have invented a new and useful Improvement in Valve-Gear for Direct-Action Engines, of which the following is a specification.

This invention is more especially designed for operating the valves of direct-action engines which work at a high velocity or with a very rapid repetition of the stroke of the piston and a very sudden arrest of the stroke, such, for example, as an engine the piston-rod of which carries the bits of a stone-channeling machine. In such machines it has heretofore been difficult to obtain between the piston-rod and a reciprocating valve a connection for working the valve from the said rod that would endure for any considerable length of time, the jar being so great that the connections heretofore employed have been liable to frequent breakage or derangement. One of the requisites of a valve-gear for such engines is that it shall consist of the smallest possible number of parts that can be affected by the jarring action, and the object of this invention is to provide such a valve-gear.

The nature of the improvement will be described with reference to the accompanying drawings, and its novelty pointed out in claims.

Figure 1 represents a vertical sectional view of such parts of the bit-operating engine of a stone-channeling machine as are necessary to illustrate my invention. Fig. 2 is a plan view of the same.

Similar letters of reference designate corresponding parts in both the figures.

A A' designate parts of the cylinder of the engine; B, the piston-rod working through a stuffing-box A² in the cylinder-head; C, the valve-chest, and D the reciprocating valve, to the operation of which my invention is applied. In this example the valve is the auxiliary valve for controlling a steam-actuated induction and eduction valve.

The valve-gear consists principally of three parts or pieces—viz., a rocking sleeve E of simple tubular form, an arm F, which connects the said sleeve with the head of the piston-rod B, and a rod G, which connects the said sleeve directly with the head $a$ of the valve-stem. The sleeve E is arranged to rock in planes parallel with the length of the piston-rod on a pin $b$, which is carried by a bracket H, rigidly affixed to the cylinder-head A'. The arm F is carried by a pin $c$, which is attached to the upper or outer end of the piston-rod B by means of a clamp I, the said pin $c$ being parallel with the pin $b$. The said arm is fitted to slide lengthwise through the sleeve. The sleeve has on its exterior two projecting integral lugs, one for the reception of the pin $b$, before mentioned, and the other for the reception of a pin $e$, with which the valve-rod G is connected and which forms a direct connection through the valve-rod between the sleeve and the valve D. In the example represented the part of the arm F which passes through the sleeve is simply turned in cylindrical shape to fit within and slide through the sleeve. The position occupied by the said pin $b$ is opposite a point midway between the points reached by the pin $c$ at the two extremities of the stroke of the piston-rod B. The connection of the valve-rod G with the sleeve E by the pin $e$ is at a distance from the pin $b$ in proportion to the length of the stroke of the piston and the length of the stroke of the valve. In the example represented this connection $e$ is between the pins $b$ and $c$.

The operation of this valve-gear will be readily understood by reference to Fig. 1, in which the piston-rod B, the sleeve E, and the arm F are respectively shown in the two positions which they occupy at the extremities of the stroke of the piston-rod. As the piston-rod makes its stroke in either direction it carries with it the attached end of the arm F and so produces the rocking movement of the sleeve E upon the pin $b$, and in so doing the said arm slides freely back and forth through the sleeve. This movement of the sleeve produces the movement of the valve without any striking action which would be liable to produce a jar, there being no relative movement between the arm F and the sleeve except the said sliding movement.

This invention is applicable to engines worked by steam, compressed air, or other motive fluid.

What I claim as my invention is—

1. In a direct-action engine, the combination with the piston-rod and the valve which controls the induction and eduction of the motive fluid to and from the engine, of a sleeve of simple tubular form, a pivotal support upon which said sleeve is capable of oscillation, an oscillating arm pivoted to the piston-rod and fitted to slide within the sleeve without other motion therein, and a direct connection between said sleeve and the valve, substantially as herein described.

2. In a direct-action engine, the combination with the piston-rod and a valve-rod for operating the valve which controls the induction and eduction of the motive fluid to and from the engine, of a sleeve of tubular form having two integral projecting lugs, a support affixed to the engine, a pivotal pin connecting said sleeve through one of its lugs with said support, a pivotal pin connecting said sleeve by its other lug with the valve-rod, and an arm pivoted to the piston-rod and sliding through the said sleeve, substantially as herein set forth.

HENRY C. SERGEANT.

Witnesses:
FREDK. HAYNES,
IRENE B. DECKER.